W. H. JOHNSON.

Shovel Handle.

No. 9,728. Reissued May 31, 1881.

*Witnesses.*

S. N. Piper

E. B. Prentiss

*Inventor.*

William Holman Johnson.

by R. H. Eddy atty.

N. PETERS, Photo-Lithographer, Washington, D. C.

UNITED STATES PATENT OFFICE.

WILLIAM H. JOHNSON, OF INDUSTRY, MAINE.

SHOVEL-HANDLE.

SPECIFICATION forming part of Reissued Letters Patent No. 9,728, dated May 31, 1881.

Original No. 239,509, dated March 29, 1881. Application for reissue filed April 23, 1881.

*To all whom it may concern:*

Be it known that I, WILLIAM HOLMAN JOHNSON, of Industry, in the county of Franklin and State of Maine, have invented a new and useful Improvement in Shovel-Handles; and I do hereby declare the same to be described in the following specification, and represented in the accompanying drawings, of which—

Figure 1:
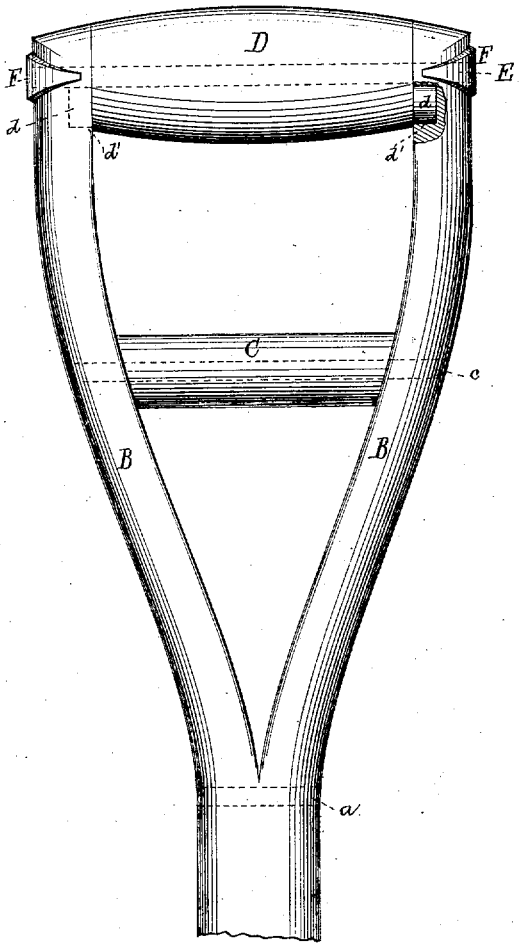
Figure 2:
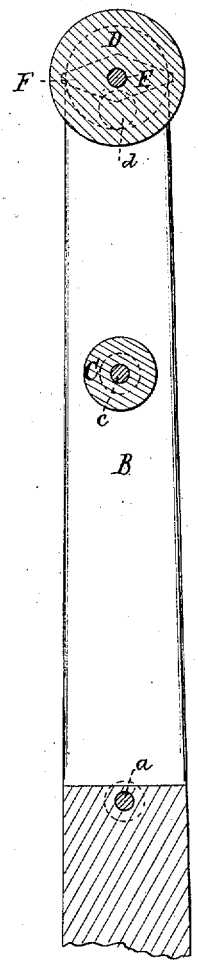

Figure 1 is a front view, and Fig. 2 a transverse section or sectional view of the bifurcated portion of a shovel-handle provided with my said invention.

The said invention relates to that class of wooden handles for shovels or similar implements wherein the upper portion of the handle, or that portion thereof which is fastened to the round or hand-gripe at its ends, and receives the hand of a person while hold of the round, is bifurcated, and has its prongs formed by being steamed and subsequently bent to their proper curved shapes, the objects of the invention being to so secure the round to the prongs as to prevent it from working loose and turning between them, and also to prevent them in drying or at any time from contracting or straightening, so as to open the joints between them and the ends of the round or gripe.

The wooden brace and its metallic rivet or bolt, as arranged and combined with the prongs, are analogous to such devices as are used in crutches; but in the latter, owing to the distance of the brace from the crutch-head or arm-support connecting the forks of the crutch, such brace and its bolt or rivet do not, as in the shovel-handle, operate to prevent straightening of the prongs and loosening of them at their junction with the head of the crutch, such prongs between the brace and the said head being usually straight, or substantially so, and often elastic, so as to be capable of yielding or springing toward each other under downward pressure of the arm on the arm-supporter of the crutch, when such arm-supporter is flexile. Therefore it will be seen that with the shovel-handle curved and rigid prongs, which have been shaped by steaming and bending them, a new result follows from their combination with the hand-gripe and the wooden brace and metallic bolt or rivet, arranged with them, as hereinafter described, and as represented, as they not only prevent the subsequent straightening of the prongs and their disturbance of their connection with the hand-gripe, but they prevent each prong from bending laterally under the strains to which they may be subjected while the shovel may be in use, such bending tending also to loosen their connection with the hand-gripe.

In constructing the handle the blank is first to be sawed or split lengthwise from its upper end the necessary distance for bifurcating it, and it is to be provided with the ordinary rivet, *a*, which should be arranged in it transversely at or near the base of each of the prongs B B, which subsequently should be steamed, so as to render them sufficiently flexile. Next, the brace C, usually of wood, is to be placed in position between the prongs, and there secured by the bolt or rivet *c*, provided with washers at its ends, such bolt going through both prongs and brace.

The tubular round or hand-gripe D is furnished at its ends with tenons *d d*, arranged eccentrically with such ends, the prongs B B being provided with recesses or mortises *d′ d′*, corresponding with and to receive such tenons. The prongs are also to be bored in prolongation of the bore of the round, and after the said round or hand-gripe D has been properly arranged between the prongs, it is to be secured thereto by a bolt or rivet, E, going through it and them, and also through curved washers F F, arranged as shown, such washers clasping the prongs, so as to prevent them from splitting at their ends.

The tenons of the hand-gripe, being eccentric therewith, not only serve to prevent it from turning between the prongs and on the rivet, but to strengthen the connection of the hand-gripe and the prongs.

What I claim as my invention is as follows—that is to say:

In the shovel-handle I claim—

1. The combination of the hand-gripe D, provided with the eccentrically-arranged tenons, as described, with the prongs having the mortises and bolt-holes, and with the bolt E and the end clasps, F F, all being arranged and adapted substantially as set forth.

2. In combination with the steamed and curved prongs B B and the round or hand-gripe D connected therewith, the brace C and the bolt or rivet *c*, all being arranged substantially as set forth.

3. In combination with the steamed and curved prongs B B and the round or hand-gripe D connected therewith, the brace C and the bolt or rivet *c* and its end washers, all being arranged substantially as set forth.

WILLIAM HOLMAN JOHNSON.

Witnesses:

R. H. EDDY,

E. B. PRATT.